June 9, 1959 W. E. VAN DORN 2,889,788
DOUBLE LEVEL TILLER PLANTER
Filed April 20, 1956 2 Sheets-Sheet 1

INVENTOR.
WILLIAM E. VAN DORN
BY
ATTORNEYS

June 9, 1959  W. E. VAN DORN  2,889,788
DOUBLE LEVEL TILLER PLANTER
Filed April 20, 1956  2 Sheets-Sheet 2

INVENTOR.
WILLIAM E. VAN DORN

BY

ATTORNEYS

United States Patent Office 2,889,788
Patented June 9, 1959

2,889,788

DOUBLE LEVEL TILLER PLANTER

William E. Van Dorn, La Jolla, Calif.; Margery S. Van Dorn, executrix of the estate of said William E. Van Dorn, deceased Application April 20, 1956, Serial No. 579,624

1 Claim. (Cl. 111—80)

This invention relates to agricultural implements and more particularly to apparatus for tilling or simultaneously tilling, fertilizing and planting.

The lack of an adequate solution of the problem of dry land farming is forcibly manifested by the continued existence and creation of dust bowls despite extensive widespread efforts to resist the effects of erosion by wind and water. In dry land farming, practiced in regions of inadequate rainfall, the fields must be tilled and left fallow for a considerable length of time in order to condition the soil for planting. Tilling implements now in use, such as the mold board plow, disc, and disc plow, will turn over and bury to a large extent the upper soil layers comprising the erosion resistant surface growth. These implements greatly overwork and pulverize the soil thus destroying cohesion and erosion resistance. Additionally there remain after such tilling large clods of earth which must be broken by further cultivation for proper planting. This burial of the surface growth is largely responsible for water and wind erosion since the protective surface growth ground cover cannot function as such below the surface. Such implements as the ripper or subsoiler fail to provide adequate tillage and must be followed by additional cultivation.

While the theoretical solution to the problem concerning the proper use of fertilizer in planting is known, practical apparatus for applying this solution on a large scale has not previously existed. For proper and safe application of fertilizer of any type, the fertilizer must be placed directly beneath the seed or material to be propagated, as deeply as possible, and separated therefrom by a layer of soil in order to prevent harmful effects such as burning and the like. Fertilizer, at present, is deposited together with the seed, above the seed or at safe distances alongside the seed.

The present invention comprises practical apparatus which effectively solves the problem of proper placement of fertilizer and includes, as an element of such apparatus, means for effecting erosion resistant tilling. To this end there is provided a tilling implement comprising a V-shaped sweep blade having rigidly secured to the forward portion thereof a deep tilling ripper blade which extends substantially below the sweep blade. Thus deep tilling, loosening of all of the upper surface, and the killing of surface growth can be simultaneously effected without burying any substantial portion of the erosion preventing surface growth. For combined tilling, fertilizing and planting, the tilling implement of this invention is mounted in tandem with a fertilizer spout and seed spout which are connected with suitable hoppers and chutes. The fertilizer spout is placed at the level of the bottom of the ripper blade whereby soil temporarily displaced by the ripper blade and sweep blade will cover the fertilizer as it assumes its position of repose. Upon this line of soil-covered fertilizer is deposited seed from the seed spout which is positioned above and behind the fertilizer spout.

It is an object of this invention to improve methods and apparatus for tilling and planting.

It is a further object of this invention to reduce erosion of a tilled field.

Another object of this invention is the adequate tilling and cultivation of a field without substantially reducing its resistance to erosion.

Still another object of this invention is the improvement of the placing of material to be propagated and of the fertilizer therefor.

A further object of this invention is the combined tilling, planting, and fertilizing of a field in a single operation.

Other objects and many of the attendant advantages of this invention will be readily appreciated as the same becomes better understood by reference to the following detailed description when considered in connection with the accompanying drawings wherein:

Fig. 1 comprises a perspective view of the ripper sweep of this invention;

In the drawings, like numerals refer to like parts.

Figure 1:
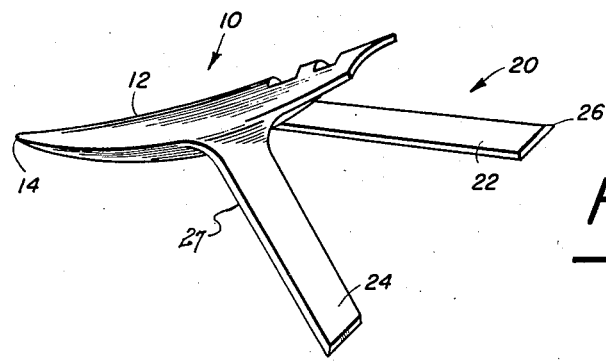
Figure 2:
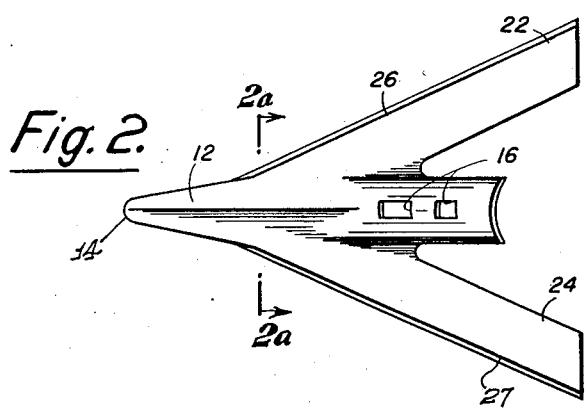
Fig. 2 is a plan view of Fig. 1.
Figure 2A:
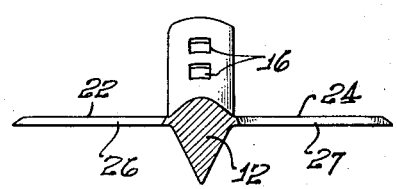
Fig. 2a is a section on line 2a—2a of Fig. 2.

The ripper sweep 10 comprises a rigid, curved, elongated ripper blade 12 having a lower or earth penetrating end 14 and one or more apertures 16 adapted to receive bolts or the like by means of which the ripper sweep is detachably secured to a pivoted and resiliently mounted carrying bar 18. Rigidly secured to blade 12 at a portion thereof substantially spaced from lower end 14 is a sweep blade or arm 20 which comprises a pair of substantially flat blade portions 22, 24 angulated relative to each other and each angularly related to the ripper blade in two dimensions, vertically and horizontally. Blade portions 22, 24 are substantially coplanar and are formed with converging forward cutting edges 26, 28, each of which extends angularly outwardly in a substantially horizontal plane from the ripper blade. In use, the V-shaped sweep arm is moved horizontally, substantially parallel to and below the surface of the earth while the ripper blade, positioned at an angle to the horizontal, is moved with its lower end substantially below the horizontal cutting plane of the sweep arm.

The deep cutting point 14 of the relatively narrow ripper blade tills deeply, breaking the soil well below the surface and overturns little of the top soil and the growth thereon while the sweep blade, moving entirely below the surface, shears the roots of the surface growth, lifting, loosening, and breaking the surface soil but burying and overturning little of the surface growth. Thus erosion resistance of the soil is relatively undisturbed and newly planted seed will sprout before the surface growth recovers or the field may be left fallow without fear of erosion by wind and water.

The above described ripper sweep is particularly adapted for use in a combined, simultaneous tilling, fertilizing and planting operation by virtue of its novel action on the soil. The ripper blade end 14 provides a relatively deep furrow, the bottom of which is covered by the soil loosened by both ripper and sweep blades. As the blades move on and the loosened soil moves to a position of repose, a substantial portion of the soil flow is directed upwardly by the sweep blades and flows over the latter at the forward portion thereof before falling into the furrow provided by the ripper point. Thus the sweep blade effectively provides an increased length of soil path and delays the descent of a substantial portion of the soil to the bottom of the furrow. If, during this delay time, and before the fall of the loosened soil, fertilizer or other soil conditioner is deposited at the bottom of the furrow, the fertilizer will be covered by soil which only partially fills the furrow but does not reach the surface. Seed or other material to be propagated may then be deposited on the covered fertilizer whereby optimum placing of seed and fertilizer is effected.

Figure 5:
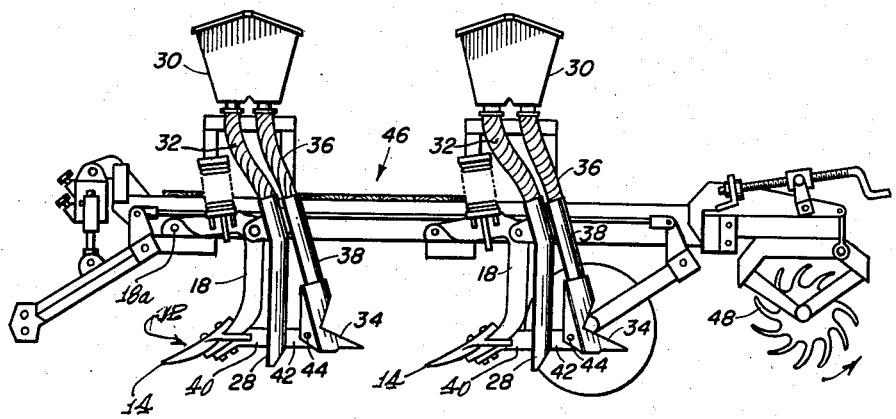
Fig. 5 is a side view of Fig. 4.

To utilize this unique soil flow, as provided by the ripper sweep, a fertilizer spout 28 is mounted directly behind and closely adjacent the ripper blade 12 with its open lower end substantially at the level of the blade end 14 whereby a soil conditioner carried in a compartmented hopper 30 may be fed through a flexible chute 32 (Fig. 5) to the spout 28 to be deposited at the bottom of the ripper furrow before the latter is covered by the soil flowing over the sweep blade. A seed spout 34 carried directly behind the fertilizer spout and ripper blade, in alignment therewith, has its lower open end positioned well above the level of the ripper point 14 and the mouth of the fertilizer spout whereby seed carried in a second compartment of hopper 30 may be fed through flexible chute 36 and a rigid chute 38 to the mouth of the seed spout to be deposited in a line directly above the line of soil covered fertilizer. The two spouts are rigidly secured to each other and to the ripper blade by centrally located bars 40, 42. Bar 40, centrally located, prevents or minimizes soil flow into the furrow ahead of the fertilizer spout. Bar 42 together with the forward portion of the seed spout serves to ensure an adequate depth of soil opening above the covered fertilizer to receive the seed. While it has been found that optimum results are obtained with the mouth of the seed spout located substantially at the level of the plane of the sweep blade and must, of course, be substantially above the mouth of the fertilizer spout, the seed spout may conveniently be mounted for vertical adjustment relative to chute 38 and bar 42.

Figure 3:
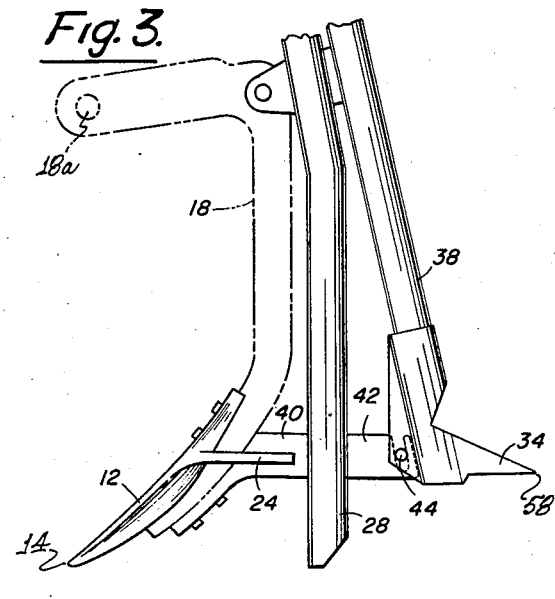
Fig. 3 is a side view of the ripper sweep mounted with the fertilizer and seed spouts.
Figure 3A:
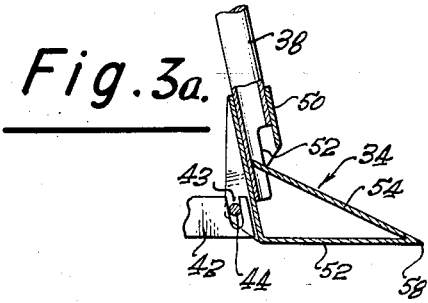
Fig. 3a is a fragmentary section of the seed spout.

Fig. 3a shows the seed spout 34 and its adjustable mounting on the central bar 42. As shown, adjustment of the height of the seed spout relative to the blade 12 may be had by slotting bar 42 as indicated at 43. A tubular part 50 of the spout fits slidably over the lower end of tube 38. The lower end part of that tube is half cut away as indicated at 52. A tongue 54, integral with the spout shoe 56, projects diagonally upwardly from the rear end 58 of the shoe and projects its rear upper end into the tube 38. Seed falling through 38 is deflected down 54 and delivered to the soil at 58.

Fig. 3 shows approximately correct horizontal spacings of the fertilizer and seed spouts relative to blade 12 for an approximate travel speed of 3 m.p.h.; the scale of the drawings being such that seed delivery point 58 is about ten inches behind spout 28. The illustrated location of fertilizer spout 28, with relation to blade 12 and sweeps 24 is about as far to the rear as practicable; it can be located somewhat further forward, closer to 12, and between the sweeps 24 if desired.

Figure 4:
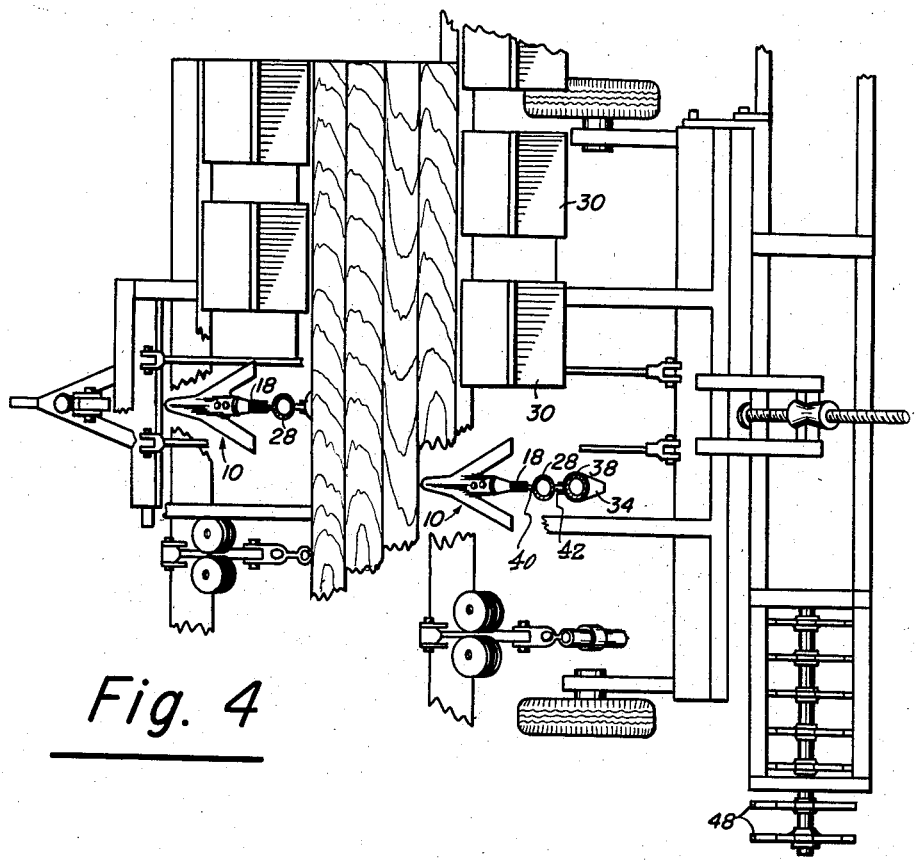
Fig. 4 is a plan view, with parts broken away, of a mobile support carrying the apparatus of this invention.

The hoppers, chutes, spouts, and blades are mounted on any suitable tractor drawn mobile support 46, the details of which form no part of this invention and which may conveniently be conventional planting apparatus adapted to carry at least two longitudinally spaced sets of the described tiller planter of this invention. This spacing in the direction of travel is provided in order to obtain a small overlapping of the ends of transversely adjacent sweep blades in different longitudinal rows, as shown in Fig. 4, whereby complete tilling of the area traversed is effected. A rotary hoe 48, mounted to run backwards may be provided to complete the operation, ensure covering of the seed and partially bury to a slight depth the loose surface growth, or conventional seed covering implements may be employed.

The bar 18, that carries blade 12 and its sweeps, and the fertilizer and seed spouts, is pivotally hung at 18a so as to swing back and up to allow the blade and other parts to pass over any immovable object in the soil without damage. The rotary hoe 48 is rotated in the direction indicated by running freely on the soil. It operates to press the soil and surface mulch down over the deposited seed.

Obviously many modifications and variations of the present invention are possible in the light of the above teachings. It is therefore to be understood that within the scope of the appended claims, the invention may be practiced otherwise than as specifically described.

What is claimed is:

A tiller planter comprising in combination a carriage having a longitudinal line of travel, a ripper sweep mounted on the carriage and comprising a forwardly and downwardly extending, furrow-forming, blade and a V-shaped sweep having soil shearing arms extending rearwardly and outwardly from the blade in a substantially horizontal plane above the lower end of the blade and adapted to shear the soil in a substantially horizontal plane below the surface thereof, a fertilizer spout mounted on the carriage with a lower delivery end immediately behind the blade at substantially the level of the blade end and substantially between the sweep arms, a seed spout mounted on the carriage with a lower delivery end at a level above the end of the blade, substantially not above the level of the sweep, and spaced a distance behind the fertilizer spout, and a rolling soil firming member mounted on the frame behind the seed spout for firming and leveling the soil over the seed and pressing in surface debris, the relation of the sweep to the fertilizer and seed spouts being such that soil loosened and raised by the sweep and blade flows over the arms of the sweep in falling into the furrow between the two spouts.

References Cited in the file of this patent

UNITED STATES PATENTS

| | | |
|---|---|---|
| 904,410 | Collins | Nov. 17, 1908 |
| 1,254,266 | Patric | Jan. 22, 1918 |
| 1,869,723 | Stevens | Aug. 2, 1932 |
| 1,876,776 | Smith | Sept. 13, 1932 |
| 1,908,903 | Kovar | May 16, 1933 |
| 2,159,652 | Brunner | May 23, 1939 |
| 2,322,332 | White | June 22, 1943 |
| 2,577,363 | Poynor | Dec. 4, 1951 |